United States Patent
Ok

(10) Patent No.: US 6,934,886 B2
(45) Date of Patent: Aug. 23, 2005

(54) DEBUGGING APPARATUS AND METHOD

(75) Inventor: Jae Chul Ok, Seoul (KR)

(73) Assignee: LG Electronics Inc., Seoul (KR)

( * ) Notice: Subject to any disclaimer, the term of this patent is extended or adjusted under 35 U.S.C. 154(b) by 459 days.

(21) Appl. No.: 10/058,847

(22) Filed: Jan. 25, 2002

(65) Prior Publication Data

US 2002/0152427 A1 Oct. 17, 2002

(30) Foreign Application Priority Data

Apr. 13, 2001 (KR) .......................... 2001/19883

(51) Int. Cl.$^7$ .............................................. G06F 11/00
(52) U.S. Cl. ........................... 714/34; 714/45; 717/128; 717/129
(58) Field of Search .................... 714/34, 35; 717/129

(56) References Cited

U.S. PATENT DOCUMENTS

| 6,145,123 A | * | 11/2000 | Torrey et al. ............... 717/128 |
| 2002/0064646 A1 | * | 5/2002 | Waldie et al. ................ 703/26 |
| 2002/0188813 A1 | * | 12/2002 | Cheung et al. ............. 711/154 |

* cited by examiner

Primary Examiner—Robert Beausoliel
Assistant Examiner—Aaron Matthew
(74) Attorney, Agent, or Firm—Lee, Hong, Degerman, Kang & Schmadeka

(57) ABSTRACT

A debugging apparatus includes: a processor core operated by a program stored in a program memory to read a data stored in a data memory or write a data; a debugger controller for performing a debugging on the processor core upon receipt of a command from a host computer and outputting a data break point address; and a memory break controller for observing an address of a data memory used by the processor core, recognizing an address as a break point address to output a break signal to the debugger controller and the processor core to suspend the operation of the processor core, when the address is sensed to be identical, and transmitting a corresponding address and data to the host computer through the debugger controller. Since an address and a data of a specific data memory are monitored to recognize a data flow and change of the specific address, an error that an erroneous calculation is inputted a during processing or a data memory is erroneously assigned is quickly sensed. Thus, a time and an expense for a debugging operation can be much saved. In addition, by adding a data debugging method to the conventional program debugging method, a program development environment is set similar to an environment substantially operated by the processor. Thus, a time and an expense for developing a program can be also saved.

15 Claims, 4 Drawing Sheets

DEBUGGING APPARATUS AND METHOD

BACKGROUND OF THE INVENTION

1. Field of the Invention

The present invention relates to a debugging apparatus and method, and more particularly, to a debugging apparatus and method that is capable of recognizing a data conversion in a specific memory location by observing a change and flow of specific data memory location and performing a debugging process.

2. Description of the Background Art

In general, a debugging apparatus for detecting an error generated in a program input to a microprocessor includes a host computer and a microprocessor unit (MPU).

In the debugging apparatus, when the host computer selects a specific address of program memory in the MPU as a break point, the MPU monitors the processor while the processor is being operated and when the specific address of the program memory accessed is identical to the memory address selected as the break point, the MPU recognizes the selected memory address as a break point and discontinues the operation of the processor and the host computer observes the flow of the program and performs a debugging process.

FIG. 1 is a schematic block diagram of the debugging apparatus in accordance with the conventional art.

As shown in FIG. 1, the debugging apparatus includes: a host computer 1 for selecting a specific address of a memory as a break point and performing a debugging process; a debugger controller 2 for receiving a control command from the host computer I and outputting a break enable signal and a break point address; a processor 4 operating upon receiving a control signal from the debugger controller 2; a program memory 5 for storing a program of the processor 4; a data memory 6 for storing data of the processor 4; and a break point sensing unit 3 for receiving the break enable signal and the break point address from the debugger controller 2, observing an address of the program memory 5 being executed in the processor 4, and recognizing the address as a break point and outputting a break signal to the debugger controller 2.

The operation of the debugging apparatus constructed as described above will now be explained.

When the processor is switched to a debugging mode, the host computer 1 outputs a processor stop signal and a break point address to the debugger controller 2 for debugging.

The debugger controller 2 outputs a stop signal to the processor 4 to suspend the processor 4 operation and outputs a break point address and a break enable signal to the break point sensing unit 3.

When the break point sensing unit 3 stores a program address in the program memory at which the processor 4 is to suspend operation, or a break point address, the host computer 1 operates the processor 4 in the order of programs stored in the program memory 5.

While the processor 4 is operated, the break point sensing unit 3 observes a program address output to the processor 4.

Subsequently, when the break point sensing unit 3 detects an accessed address of the program memory 5 as that of the stored program address, a break signal is output to the debugger controller 2.

The debugger controller 2 suspends the operation of the processor 4 according to the break signal received from the break point sensing unit 3 and shifts debugging control to the host computer 1 so that the host computer 1 may perform a debugging operation.

However, in the debugging method, since an operation is determined by an address of a specific program memory among the sequential programs, it is not possible to recognize a data flow according to a data memory. Thus, in case where an error occurs by data, much time and expense is taken for debugging.

In addition, when creating a program, since the state of data is not recognized, an error may occur in the allocation of data memory. In addition, if the wrong data is read in a calculating process, an erroneous result is output and may cause a system malfunction.

SUMMARY OF THE INVENTION

Therefore, an object of the present invention is to provide a debugging apparatus and method that is capable of saving time and expense in performing a debugging operation by recognizing a data transition state in a specific data memory by observing a change of a data address and a change of data at the specific address in data memory.

To achieve these and other advantages and in accordance with the purpose of the present invention, as embodied and broadly described herein, to there is provided a debugging apparatus including: a processor operated by a program stored in a program memory to read data stored in data memory or write data to data memory; a debugger controller for performing a debugging process on the processor upon receipt of a command from a host computer and outputting a data break point address; and a memory break controller for observing an address of a data memory accessed by the processor, recognizing an accessed address as a break point address and outputting a break signal to the debugger controller and the processor to suspend the operation of the processor, when the address accessed is identical to the address to be observed, and transmitting the address and corresponding data to the host computer through the debugger controller, To achieve the above objects, there is further provided a debugging method including the steps of: outputting an address of a data memory to be observed, or a break point address, and a break enable signal when a processor is switched to a debugging mode; storing the output break point address, and operating the processor in a general operation state; comparing the stored break point address and the address of the data memory currently accessed by the processor; outputting a break signal to suspend operation of the processor if the address of the data memory currently accessed by the processor and the stored break point address are identical; and suspending operation of the processor by the output break signal and switching the processor to a debugging mode to debug the program.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
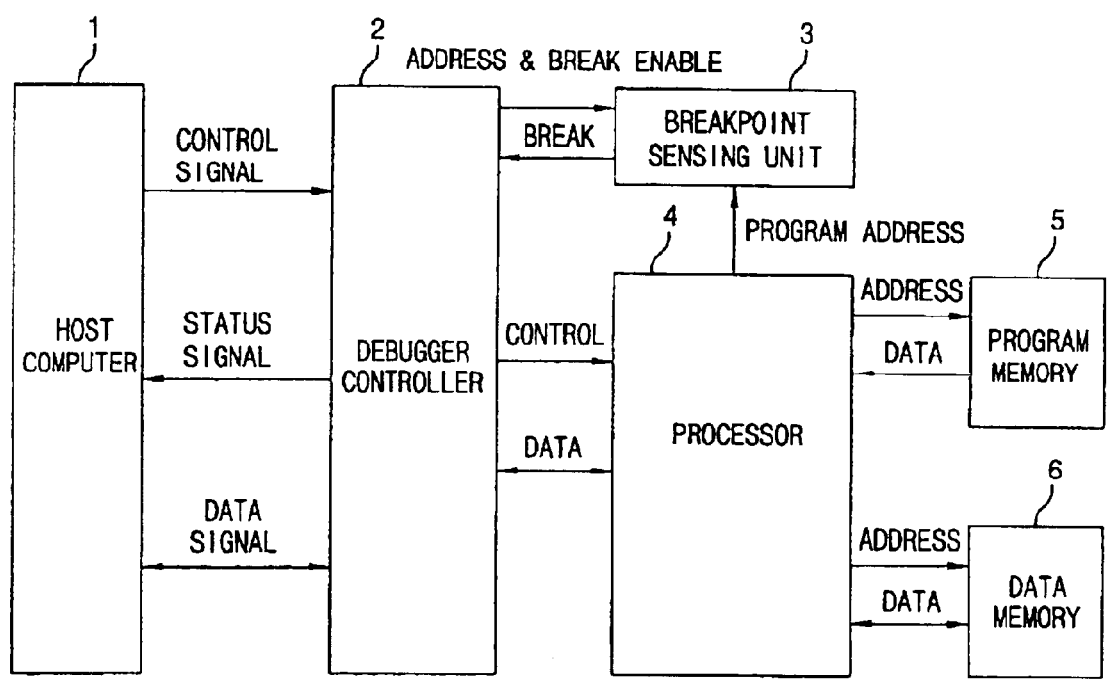
FIG. 1 is a schematic block diagram showing a debugging apparatus in accordance with a conventional art.
Figure 2:
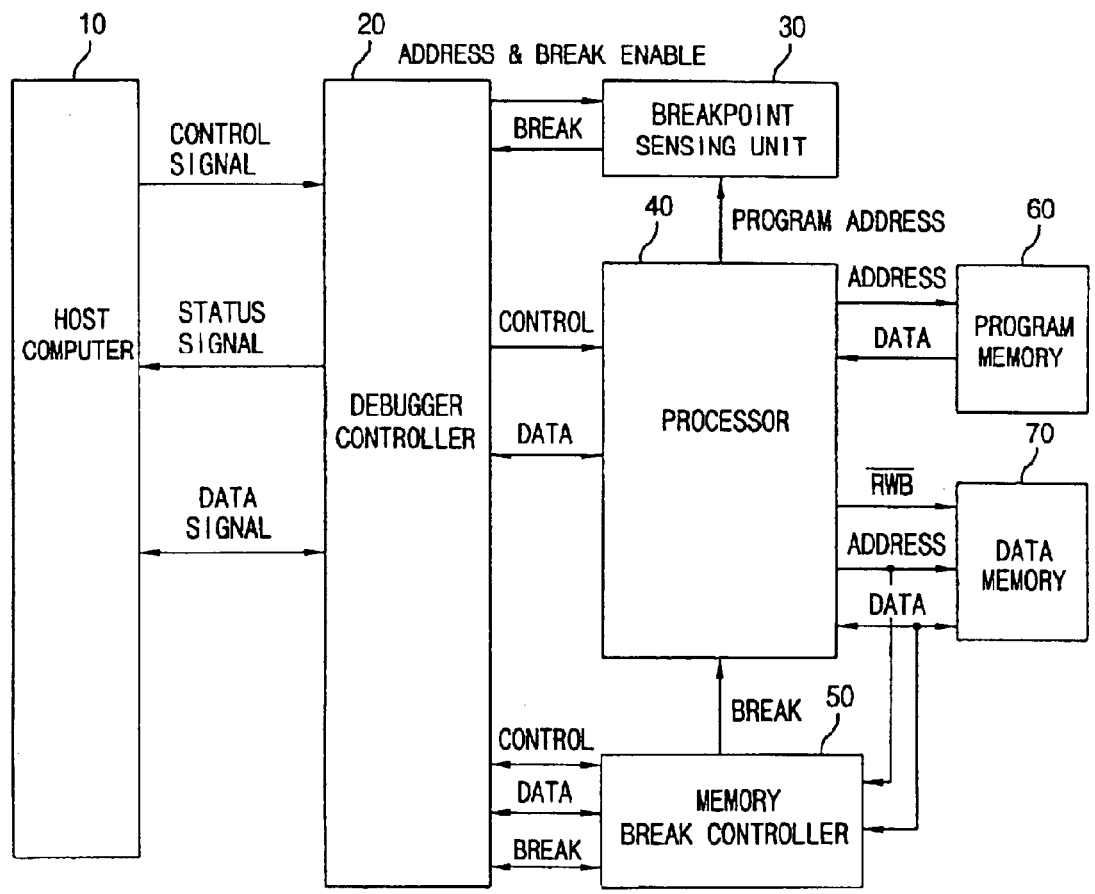
FIG. 2 is a schematic block diagram showing a debugging apparatus in accordance with a preferred embodiment of the present invention.

FIG. 2 is a schematic block diagram showing a debugging apparatus in accordance with a preferred embodiment of the present invention.

As shown in FIG. 2, a debugging apparatus of the present invention includes a host computer 10 for assigning a break point address and controlling a debugging operation; a debugger controller 20 for outputting a control signal to control a processor, a break point address and a break enable signal; a program memory 60 for storing a program to operate a processor 40; a processor 40 operated according to the control signal output from the debugger controller 20 and the program stored in the program memory; a data memory 70 for storing data output from the processor 40; a break point sensing unit 30 for observing an address of the program memory 60 accessed by the processor 40, recognizing an address as a debugger break point and transmitting a break signal to the debugger controller 20 if the accessed address is identical to the break point address output from the debugger controller 20; and a memory break controller 50 for observing an address and data of the data memory 70 accessed by the processor 40, transmitting the currently accessed address and the corresponding data to the host computer 10 though the debugger controller 20 and activating an operation of the processor 40 to transmit the address and data of the data memory accessed by the processor 40 to the host computer 10 through the debugger controller 20 until a break signal is output again when the same address as the break address output from the debugger controller 20 is identified.

The host computer 10 recognizes a data flow and change according to the address and the data output from the memory break controller 50.

The construction of the memory break controller of the debugging apparatus will now be described with reference to FIG. 3.

Figure 3:
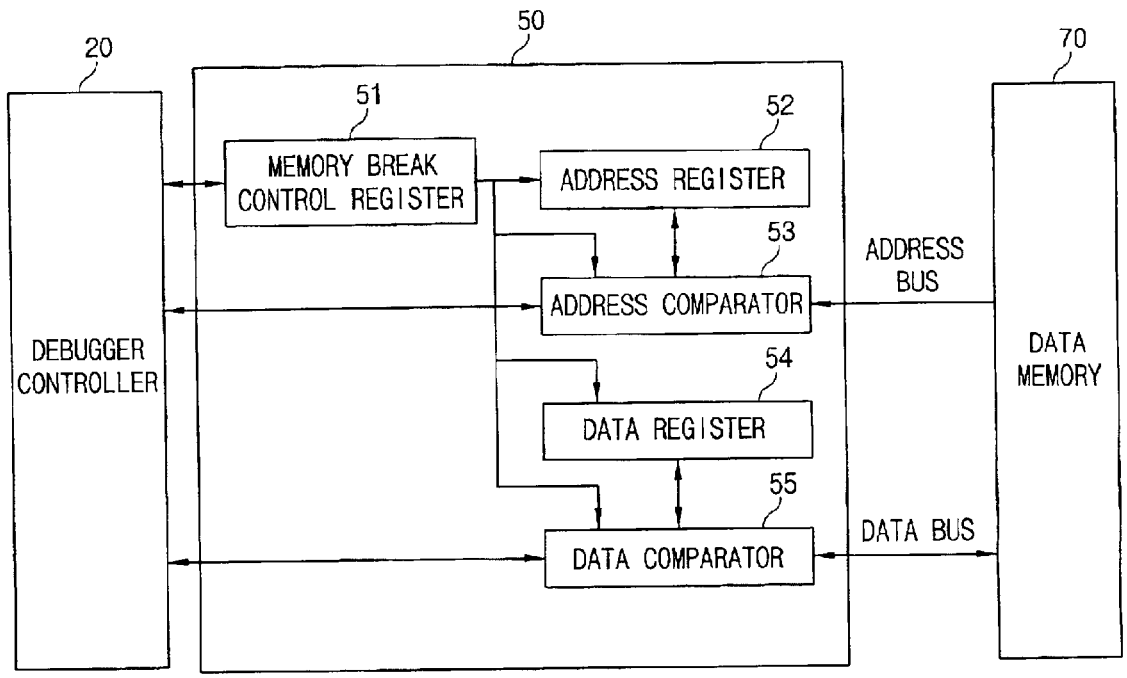
FIG. 3 is a detailed block diagram showing a memory break controller of FIG. 2 in accordance with the preferred embodiment of the present invention.

FIG. 3 is a detailed block diagram showing a memory break controller of FIG. 2 in accordance with the preferred embodiment of the present invention.

As shown in FIG. 3, the memory break controller 50 includes a memory break control register 51 being activated by a control signal and a break point address signal output from the debugger controller 20 and observing a data change of the processor 40; an address register (AR) 52 for storing the break point address output from the memory break control register 51; an address comparator (AC) 53 for comparing the address currently output from the data memory 70 and the break point address stored in the address register 52; a data register (DR) 54 for storing data stored at the break point address; and a data comparator (DC) 55 for comparing the data stored at the break point address of the data memory 70 and the data value of the break point address stored in the data register 54.

The construction of the memory break control register 51 will now be described with reference to FIG. 4.

Figure 4:
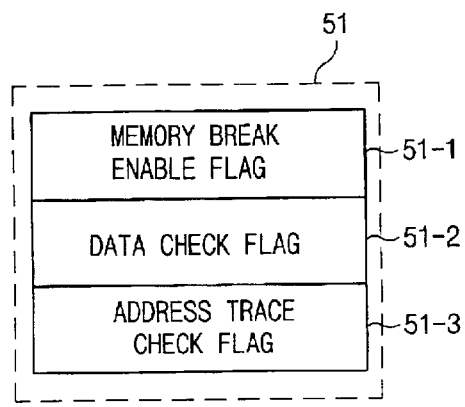
FIG. 4 is a schematic block diagram showing the structure of a memory break control register of FIG. 3 in accordance with the preferred embodiment of the present invention.

FIG. 4 is a schematic block diagram showing the structure of a memory break control register of FIG. 3 in accordance with the preferred embodiment of the present invention.

As shown in FIG. 4, the memory break control register 51 includes: a memory break enable flag (MBEF) 51-1 for activating the memory break controller 50; a data check flag (DCF) 51-2 for sensing an address of the data memory which is identical to the break point address stored in the address register 52 and being enabled when the data of the corresponding address is output; and an 1s address trace check flag (ACF) 51-3 assigning an initial break point address, being enabled when the content of the break point address is read during the processing procedure, and outputting the data and the addresses of every memory location read from or written to by the processor until the content of the break address is updated.

The operation of the debugging operation constructed as described above will now be explained with reference to FIG. 5.

Figure 5:
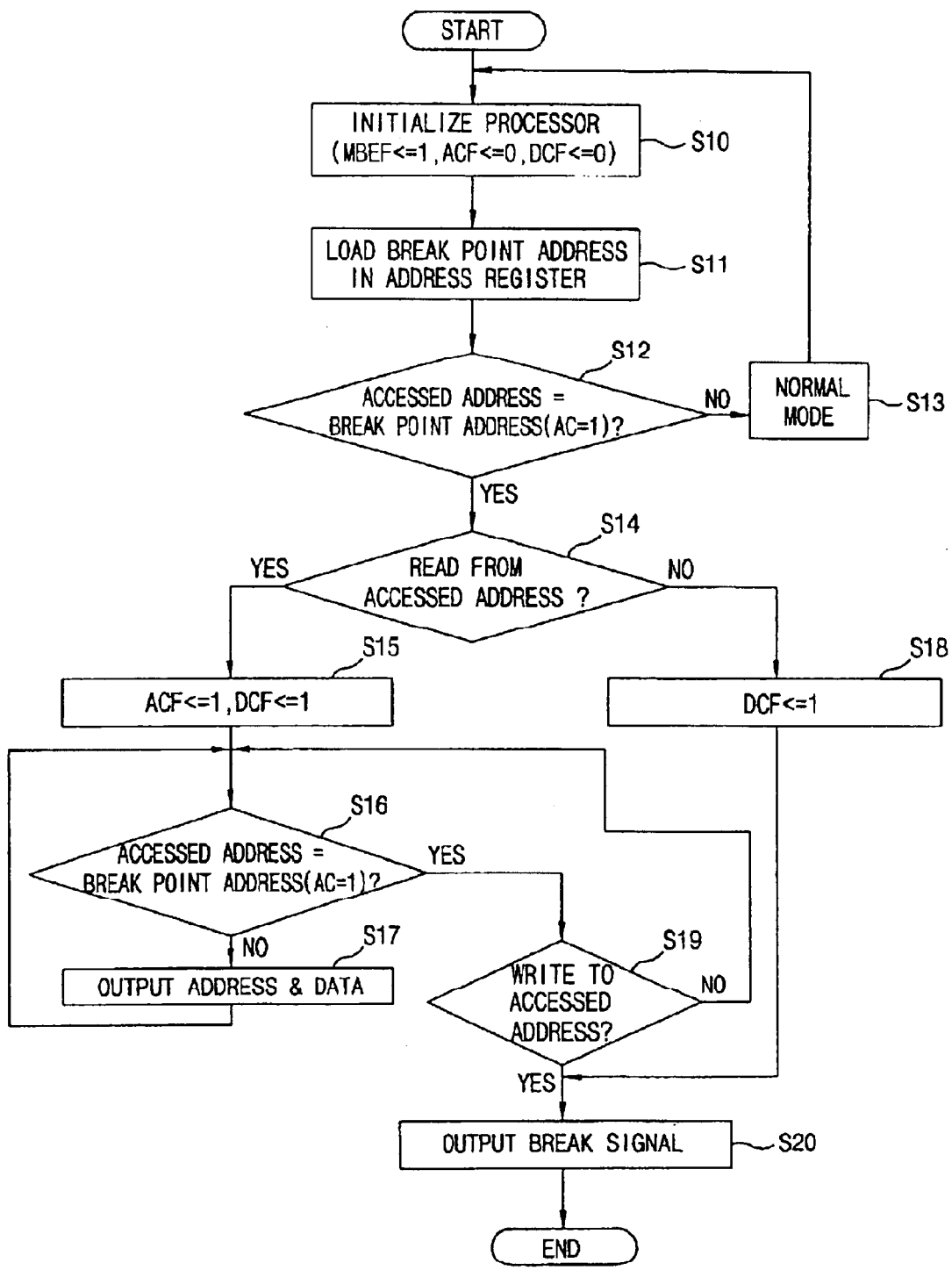
FIG. 5 is a flow chart of a debugging method in accordance with the preferred embodiment of the present invention.

FIG. 5 is a flow chart of a debugging method in accordance with the preferred embodiment of the present invention.

As shown in FIG. 5, while the processor in the host computer 10 is being operated and is switched to a debugger mode, the host computer 10 disables the debugger mode, so that the host computer sets a start position of a debugger mode program as a start position of the processor and outputs an initialization control signal and an address of the data memory to be observed, or a break point address, to the debugger controller 20.

According to the control signal and the break point address output from the host computer 10, the debugger controller 20 outputs the control signal, the break point address and the break enable signal to the memory break controller 50 and the break point sensing unit 30.

The break point sensing unit 30 receives and stores the break enable signal and the break point address.

According to the received break enable signal, the memory break control register 51 of the memory break controller 50 enables a memory break enable flag (MBEF) as '1' and disables a data check flag (DCF) and an address trace check flag (ACF) as '0' (step S10), thereby initializing the processor.

The address register 52 of the memory break controller 50 stores the inputted break point address (step S11).

After completing the process, the host computer 10 operates the processor 40 according to programs stored in the program memory 60.

When the processor 40 is operated according to the program sequentially stored in the program memory, the break point sensing unit 30 monitors whether the break point address stored in the processor 40 and the address of the program memory 60 accessed by the processor 40 are identical.

The address comparator 53 (AC) of the memory break controller 50 compares the address of the data memory 70 used by the processor 40 and the break point address (step S12).

If the address of the data memory 70 accessed by the processor 40 and the break point address stored in the address register 52 are identical such that the address comparator 53 is enabled, the address comparator 53 outputs an accord signal to the debugger controller 20.

The debugger controller 20 determines whether the processor 40 is reading data from the address of the data memory 70 or writing data to the address of the data memory 70 (step S14).

If the processor 40 is writing data to the data memory 70, the debugger controller 20 enables a data check flag (DCF) 51-2 of the memory break control register 51 (step S18) and outputs a break signal to the processor for suspending is execution of the program of the processor 40 (step S20) such that the operation of the processor is discontinued.

If the processor 40 reads data from the address of the data memory 70, the debugger controller 20 enables an address trace check flag (ACF) 51-3 and a data check flag (DCF) 51-2 of the memory break control register 51 (step S15).

The data at a specific address of the data memory (70) read by the processor 40 may have an arithmetic and logical relation to the data at a different address or a correlation with another specific address of the data memory 70.

Accordingly, if data of a specific address is read, when the address trace check flag (ACF) 51-3 and the data check flag (DCF) 51-2 are enabled, the address comparator 53 compares the specific address and the break point address (step S16).

When the break point address stored in the address register 52 and the accessed address of the data memory 70 are identical, the address comparator 53 transmits an accord signal to the debugger controller 30.

If, however, the break point address and the address of the data memory are not identical such that the value of the address comparator (AC) 53 is not '1', since the break point address and the address to be observed are different and logically, the address comparator 53 and the data comparator 55 transmit the address and corresponding data to the host computer 10 through the debugger controller 20 for a debugging operation (step S17).

If the address comparator (AC) 53 is enabled, it indicates that the previously read address to be observed is accessed and the debugger controller determines whether the processor 40 is reading data from the address or writing data to the address (step S19).

If data is being read from the data memory 70 address to be observed, since it is the previously read address, the address comparator 53 of the memory break controller 50 compares the next read address and the break point address to determine whether the read address is identical to the break point address stored in the address register 52 (step S16).

If a data value is being written to the address to be observed, since a result value according to an arithmetic operation is being written in the previously read address, the memory break controller 50 outputs a break signal to the debugger controller 20 and the processor 40 (step S20) in order to discontinue the operation of the processor 40.

Upon receiving the break signal, the debugger controller 20 outputs a signal allowing the host computer 10 to start a debugging operation. The host computer 10 performs a debugging operation according to the output signal.

Meanwhile, if the address to be observed and the address of the data memory currently accessed by the processor 40 are different (step S12), the memory break controller 50 outputs the address-and data of the data memory 70 location currently accessed by the processor 40 to the host computer 10.

Subsequently, the address comparator 53 compares the address of the next data memory 70 location accessed by the processor 40.

The operation of the debugging apparatus as described above will now be explained in detail by considering the following program as an example.

$$A0=a \quad (1)$$
$$A1=b \quad (2)$$
$$A2=c \quad (3)$$
$$A2=A2+(A1*A2) \quad (4)$$

wherein A0, A1 and A2 are addresses of the data memory. The program stores initial values a, b and c in, respectively, memory locations A0, A1 and A2 in steps 1–3. The program then updates the value stored in memory location A2, in step 4, based on the current value of memory location A2 and the initial value of A1.

In the program constructed as described above, the host computer 10 designates an address to be observed as A2 and executes the program in a debug mode.

The address comparator 53 performs a debugging process by comparing A2, the address to be observed, and the currently accessed address. When the address comparator 53 reads a data value 'c' corresponding to A2, it senses A2 as the address to be observed.

When the address comparator 53 identifies A2 as the address to be observed, the memory break control register 51 outputs a break signal to the processor 40 in order to discontinue program operation, and determines whether A2 of formula (3) is being read from or written to.

If A2 is being read from, the memory break control register 51 transmits the A2 address and the data value 'c' to the host computer 10.

If executing continuously, the memory break controller 50 reads addresses of every memory location accessed until the next value is written to A2 and the contents of the memory location are output. That is, the address comparator 53 continuously executes the processor, stops when A2 is accessed in formula (4), and compares A0, A1 and A2 with the address to be observed.

After the address comparator 53 compares A0 and A1 with the address to be observed, it is determined that A0 and A1 are not identical to the address to be observed and the address comparator 53 transmits a corresponding address and data value to the host computer 10. The address comparator then compares A2 of the right side of formula (4) with the address to be observed.

Since A2 is identical to the address to be observed, the memory break control register 51 determines if A2 is read from or written to.

Address A2 as presented in formula (3) is the address which was read from in the previous process, so the address comparator moves to the next address.

Subsequently, after A2 on the right side of formula (4) is compared, A2 on the left side of formula (4) is compared. It is determined whether A2 is being read from or written to.

Since A2 on the left side of formula (4) is being written to, the memory break controller 50 outputs a break signal to the debugger controller 20 and the processor 40 to suspend the operation of the processor 40.

The debugger controller 20 outputs a debugging mode switch signal to the host computer 10 in response to the break signal.

Upon receiving the debugging mode switch signal from the debugger controller 20, the host computer 10 updates the data value stored in A2 according to the previously transmitted address and data.

If a range of data addresses is stored in the address register 52, the host computer 10 designates a break point address as an uppermost address and a lowermost address corresponding to the range of addresses in register 52.

The address register 52 stores the uppermost address and lowermost address of the address range in data register 54 and sets a space for storing data stored in the range of data addresses stored in data register 54.

The address comparator 53 compares the range of addresses stored in the address register with the currently accessed address and identifies an address corresponding to the range of addresses. The operation is performed in the same manner as the case of observing one data address.

As so far described, the debugging apparatus and method of the present invention has the following advantages.

In a debugging operation, since an address and a data of a specific data memory are monitored to recognize a data flow and change of the specific address, an error caused by an erroneous calculation during processing or erroneously assigning a data memory location is quickly sensed. Thus, a time and an expense for a debugging operation can be much saved.

In addition, by adding the data debugging method of the present invention to a conventional program debugging method, the program development environment is similar to an environment in which the processor is operated. Thus, program development time and expense may be saved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A debugging apparatus comprising:
a processor operated by a program stored in a program memory to read data stored in a data memory or write data to data memory;
a debugger controller for performing a debugging on the processor upon receipt of a command from a host computer and outputting a data break point address; and
a memory break controller for observing an address of a data memory accessed by the processor, recognizing the accessed address as the break point address, outputting a first break signal to the debugger controller and the processor to suspend operation of the processor, and transmitting the accessed address and data stored at the accessed address to the host computer through the debugger controller, wherein if data is read from the accessed address by the processor, the address and corresponding data of each data memory location subsequently accessed by the processor is output to the host computer until the address identical to the breakpoint address is written to.

2. The apparatus of claim 1, wherein the data memory stores a data value outputted from the processor.

3. The apparatus of claim 1, wherein after the memory break controller transmits the accessed address and a corresponding data, the break point controller activates operation of the processor and outputs the accessed address and data of the data memory to the host computer through the debugger controller until a second break signal is output.

4. The apparatus of claim 3, wherein the host computer recognizes a data flow and change of the address and the data output from the memory break controller.

5. The apparatus of claim 1, wherein the memory break controller comprises:
a memory break control register activated by the break point address and a control signal from the debugger controller;
an address register for storing the break point address input from the memory break control register;
an address comparator for comparing the address of the data memory currently accessed by the processor and the break point address stored in the address register;
a data register for storing data stored at the break point address; and
a data comparator for comparing the data stored at the currently accessed address of the data memory and the data stored in the data register.

6. The apparatus of claim 5, wherein the memory break control register comprises:
a memory break enable flag for activating the memory break controller;
a data check flag enabled when data is read from an address of the data memory which is identical to the break point address; and
an address trace check flag enabled when data is read from the address of the data memory which is identical to the break point address.

7. The apparatus of claim 6, wherein when the address trace check flag is enabled, the addresses and corresponding data of every memory location accessed by the processor are output until the content of the break address is updated.

8. A debugging method comprising the steps of:
outputting a break point address of data memory to be observed and a break enable signal when a processor is switched to a debugging mode;
storing the outputted break point address and operating the processor in a general operation state;
comparing the stored break point address and the address of the data memory currently accessed by the processor;
outputting a break signal to suspend operation of the processor if the address of the data memory currently accessed by the processor and the stored break point address are identical;
suspending operation of the processor in response to the output break signal;
transmitting the currently accessed address and corresponding data; and
re-activating the operation of the processor and outputting the address and corresponding data of each data memory location accessed by the processor until another break signal is output.

9. The method of claim 8, wherein upon switching the processor to debugging mode, the processor is initialized by enabling a memory break enable flag of a memory break controller in response to a break enable signal, a data check flag and an address check flag are disabled, and the break point address is stored.

10. The method of claim 9, further comprising:

determining that an address of the data memory currently accessed by the processor and the stored break point address are identical;

determining whether the processor reads data from the currently accessed address or writes data to the currently accessed address;

enabling the address trace check flag and the data check flag of the memory break control register if it is determined that data is read from the currently accessed address;

re-activating the operation of the processor;

comparing a subsequently accessed address of the data memory and the stored break point address; and if the subsequently accessed address of the data memory and the break point address are not identical, transmitting the subsequently accessed address and corresponding data to the host computer.

11. The method of claim 10, further comprising:

determining that the subsequently accessed address of the data memory and the break point address are identical;

determining whether the processor reads data from the subsequently accessed address or writes data to the subsequently accessed address; and if it is determined that the processor writes data to the subsequently accessed, the data check flag of the memory break controller is enabled and a break signal for suspending the processor is outputted.

12. The method of claim 11, wherein, if it is determined that the processor reads data from the subsequently accessed address, the next data memory location accessed by the processor and the break point address are compared.

13. The method of claim 10, wherein, if it is determined that the processor writes data to the currently accessed address, the data check flag of the memory break controller is set and the operation of the processor is suspended.

14. The method of claim 8, wherein, after the operation of the processor core is suspended by the break signal, the address and data of the corresponding data memory are transmitted and the operation of the processor core is re-activated until another break signal is output.

15. A debugging method for informing a data transition state, comprising:

switching a processor to a debugging mode and outputting a break point address of a data memory to be observed and a break enable signal;

storing the break point address;

comparing the stored break point address and an address of a data memory currently accessed by the processor;

determining that the address of the data memory currently accessed by the processor and the stored break point address are identical;

determining that the processor writes data to the accessed address, enabling a data check flag of a memory break controller and outputting a break signal for suspending operation of the processor;

outputting the accessed address and the corresponding data; and re-activating the operation of the processor and outputting the address and corresponding data of each data memory location subsequently accessed by the processor until another break signal is output.

* * * * *